United States Patent
Genma et al.

(10) Patent No.: US 7,203,568 B2
(45) Date of Patent: Apr. 10, 2007

(54) NUMERICAL CONTROLLER

(75) Inventors: Eiji Genma, Yamanashi (JP); Takeshi Mochida, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/154,593

(22) Filed: Jun. 17, 2005

(65) Prior Publication Data

US 2005/0283269 A1    Dec. 22, 2005

(30) Foreign Application Priority Data

Jun. 18, 2004   (JP)   ............... 2004-181341

(51) Int. Cl.
*G06F 19/00*   (2006.01)
(52) U.S. Cl. ..................... 700/169; 700/159
(58) Field of Classification Search ................ 700/174, 700/188, 180, 110, 129, 95, 92, 169, 159; 705/105
See application file for complete search history.

(56) References Cited

U.S. PATENT DOCUMENTS

| 4,513,366 | A | 4/1985 | Munekata et al. | |
| 2003/0004605 | A1* | 1/2003 | Hamamura et al. | ......... 700/188 |
| 2003/0036868 | A1* | 2/2003 | Yutkowitz | .................. 702/105 |

FOREIGN PATENT DOCUMENTS

| DE | 100 44 306 | 4/2002 |
| EP | 0 150 217 | 8/1985 |
| JP | 07-049709 | 2/1995 |
| JP | 10-124124 | 5/1998 |

OTHER PUBLICATIONS

EP Search Report for corresponding application EP05253782.6-2206 dated Oct. 7, 2005.

* cited by examiner

*Primary Examiner*—Kidest Bahta
(74) *Attorney, Agent, or Firm*—Staas & Halsey LLP

(57) ABSTRACT

A numerical controller which enables stroke limit check during a program check performed in a machine lock state and which can shorten the time required for the program check. The numerical controller has the function of checking a program while keeping a machine motion axis as a controlled object in an immovable state, and includes motion amount calculating means for analyzing the program to calculate an amount of movement of the machine motion axis, and updater means for updating machine coordinates by the motion amount of the machine motion axis calculated by the motion amount calculating means and storing the updated machine coordinates, wherein a motion area is checked based on the stored machine coordinates. Thus, even in the machine lock state, the machine coordinates are calculated, thereby permitting the stroke limit check to be performed during the program check.

10 Claims, 8 Drawing Sheets

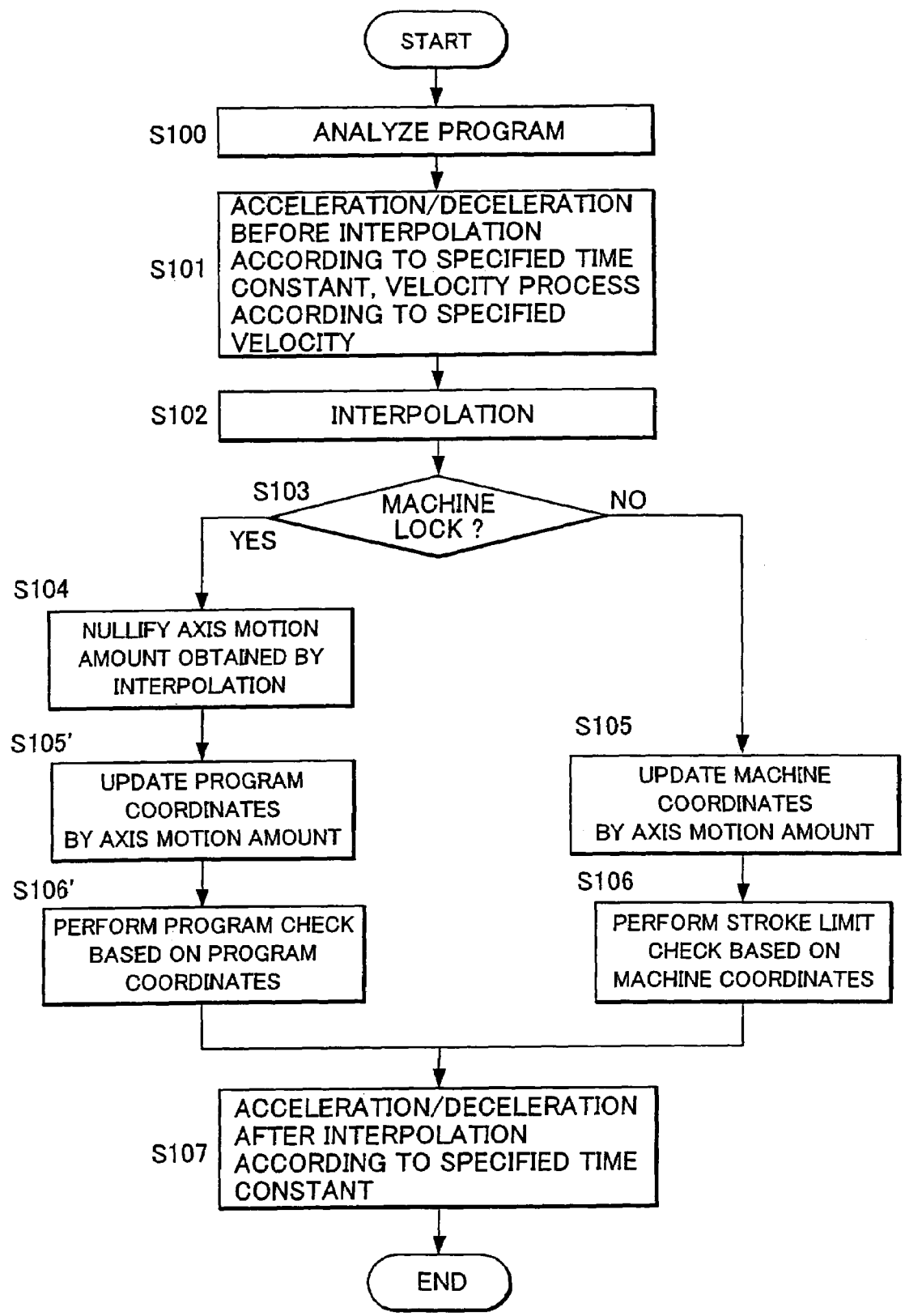

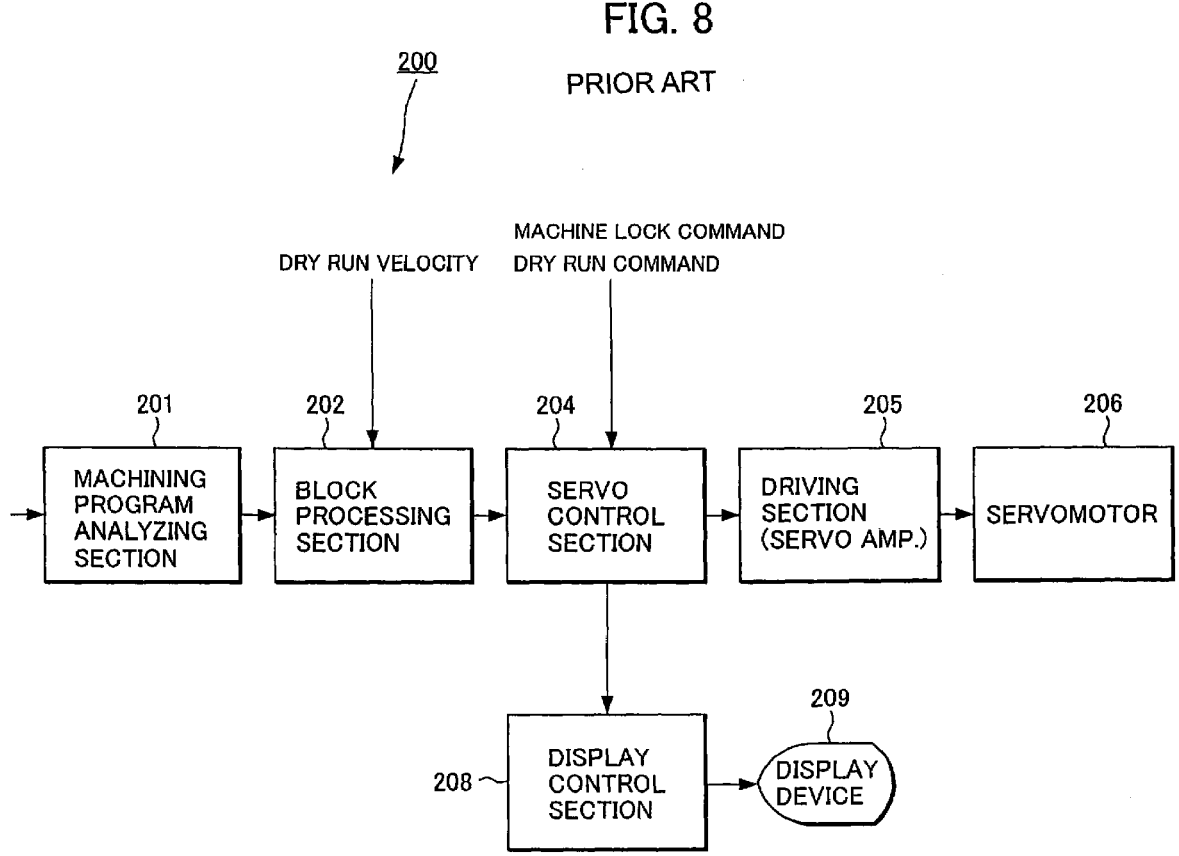

NUMERICAL CONTROLLER

BACKGROUND OF THE INVENTION

1. Field of the Invention

The present invention relates to a numerical controller, and more particularly to a numerical controller for carrying out machining program checks and stroke limit checks.

2. Description of Related Art

Numerical controllers having a program check function are known in the art. When carrying out machining with this type of numerical controller, the format of the machining program and stroke limits are checked before actual machining, to ensure that the program works properly, and then the machining is actually performed.

FIG. 7 is a flowchart exemplifying a machining simulation check executed by a controller of a numerical controller.

An MPU, which is provided in the controller, analyzes a read program (Step S100), then performs an acceleration/deceleration process before interpolation by means of a specified time constant, as well as a velocity process by means of a specified velocity (Step S101), and performs an interpolation process (Step S102).

It is then determined whether or not machine lock is specified. A machine lock state can be discriminated, for example, by determining whether or not a machine lock command is included in the NC data (Step S103). The machine lock denotes an operation wherein the programmed operation is continued while nullifying the axis movement resulting from the interpolation process, thereby retaining machine motion axes as controlled objects in immovable state.

In the case of non-machine lock, machine coordinates are updated using the axis motion amount obtained by the interpolation (Step S105), and based on the updated machine coordinates, stroke limit check is performed (Step S106).

In the case of the machine lock, the axis motion amount obtained by the interpolation is nullified and the programmed operation alone is continued, so that the machine motion axis as the controlled object does not move (Step S104). Specifically, in this case, movable parts of a machine tool are stopped and brought into a machine lock state by nullifying the axis motion amount obtained by the interpolation and outputting pulses of zero to a servo control section. While in the machine lock state, program coordinates are updated (Step S105'). The program coordinates are coordinates whose origin is defined by the machining program. In the machine lock state, machining is simulated based on the program coordinates (Step S106'). Then, acceleration/deceleration after interpolation is performed according to a specified time constant (Step S107).

A numerical controller for simulating machining is disclosed, for example, in JP07-49709A.

There has also been proposed a numerical controller for drawing a tool path to permit a program executed by the numerical controller to be checked before machining. As such numerical controller, a device disclosed in JP10-124124A, for example, is known.

FIG. 8 exemplifies the configuration of a numerical controller with a drawing function whereby a tool path is drawn at display means to permit program check.

The numerical controller 200 comprises a machining program analyzing section 201 for analyzing a machining program, a block processing section 202 for executing individual blocks of the analyzed machining program, and a servo control section 204 for controlling the operation of a servomotor 206 through a driving section (servo amplifier) 205 in accordance with motion command data from the block processing section 202. The numerical controller further comprises a display control section 208 for reading coordinates, which are position data, from the servo control section 204 to draw a tool path at a display device 209.

By inputting a machine lock command or a dry run command to the servo control section 204, it is possible to enable a machine lock function which allows the controlled axis to run idle without moving, or a dry run function which permits the feed rate to be set manually without regard to the programmed velocity. Owing to these functions, a tool path can be drawn without entailing movement of the controlled axis or movable parts of the numerical controller, in disregard of the programmed velocity.

The program is checked in the machine lock state at a dry run velocity, without accompanying axis movement. Usually, for such program check, the dry run velocity is set at a low velocity. The program check is also performed with respect to acceleration/deceleration control by executing same. Thus, since the program is run at a low dry run velocity while executing the acceleration/deceleration control, a problem arises in that the program check requires a long time.

Also, in the machine lock state, the controlled axis is not moved and only the position display thereof is changed, so that the machine coordinates are not updated. A problem therefore arises in that the stroke limit check (stored stroke check) cannot be performed.

The stroke limit check is a function whereby, if a tool enters a tool entry forbidden area set with respect to the numerical controller, the tool is decelerated and stopped and an alarm is displayed. In the machine lock state, however, since the controlled axis is not moved, it is not possible to determine whether a tool attached to the controlled axis has entered the entry forbidden area or not.

SUMMARY OF THE INVENTION

The present invention provides a numerical controller which enables stroke limit check during a program check performed in a machine lock state and which can shorten the time required for the program check.

Also, according to the present invention, machine coordinates are calculated even in the machine lock state, thereby permitting the stroke limit check to be performed during the program check. Further, in the present invention, the feed rate is set to the system's maximum velocity during the program check whereas acceleration/deceleration control is not performed, thereby shortening the time required for the program check.

A numerical controller of the present invention has a function of checking a program while retaining motion axes of a machine as controlled objects in immovable state.

To permit the stroke limit check to be performed during a program check by calculating machine coordinates even in a machine lock state, the numerical controller of the present invention comprises motion amount calculating means for analyzing the program to calculate motion amounts of the motion axes, and updating means for updating the machine coordinates by the motion amounts of the motion axes calculated by the motion amount calculating means and storing the updated machine coordinates, and checking means for checking a motion area of the machine based on the stored machine coordinates.

Thus, the motion amount calculating means calculates the motion amounts of the motion axes based on the machining program, and the updating means updates the machine coordinates by the motion amounts calculated by the motion amount calculating means. Accordingly, even in the machine lock state in which the motion axes as the controlled objects are not moved, the machine coordinates can be derived based on the machining program, permitting the stroke limit check to be performed based on the machine coordinates.

To shorten the time required for the program check, the numerical controller of the present invention comprises motion velocity commanding means for outputting a command to set maximum velocities of the motion axes, and/or acceleration/deceleration process nullifying means for nullifying acceleration/deceleration means for performing acceleration/deceleration process according to a set time constant.

The motion velocity commanding means sets the velocities of the motion axes to system's maximum values to thereby shorten the program check execution time. In the machine lock state, the motion axes are not moved, and therefore, entry into an entry forbidden area cannot be checked based on the actual position. By using position coordinates derived based on the machining program, however, it is possible to check entry into such an entry forbidden area. The position coordinates based on the program can be calculated without regard to the actual motion velocity of the motion axes, so that the velocities of the motion axes can be set to the system's maximum values.

The acceleration/deceleration process nullifying means nullifies the acceleration/deceleration means for performing an acceleration/deceleration process according to the set time constant to thereby shorten the program check execution time. A time period for performing an actual movement of the machine motion axis is elongated by a time period required for the acceleration/deceleration. The nullification of the acceleration/deceleration processing means causes a mechanical shock. However, since, in the machine lock state, the motion axes are not moved, the motion axes need not be subjected to the acceleration/deceleration process from the outset and no inconveniences arise if the acceleration/deceleration process is not performed. It is therefore possible to shorten the program check time by saving the processing time needed for the acceleration/deceleration process.

The numerical controller may be provided with both or either of the motion velocity commanding means and the acceleration/deceleration process nullifying means.

The motion amount calculating means may include a machining program analyzing section for analyzing a machining program, a block processing section for executing individual blocks of the analyzed machining program, and an interpolation processing section for performing interpolation based on motion commands in the machining program to calculate the motion amounts, and the interpolation processing section may calculate the motion amounts based on the maximum velocities commanded by the motion velocity commanding means. This configuration makes it possible to shorten the program check time.

The updating means may include a first storage section for storing machine coordinates updated with actual motions of the motion axes by feedback amounts of the motion axes and the motion amounts calculated by the interpolation processing section, and a second storage section for storing provisional machine coordinates updated without actual motion of the motion axes only by the motion amounts calculated by the interpolation processing section, and the checking means may check the motion area based on at least the provisional machine coordinates stored in the second storage section.

Also, the updating means may stop the updating of the machine coordinates by the first storage section and start the updating of the provisional machine coordinates by the second storage section in response to a command from the acceleration/deceleration process nullifying means.

According to the present invention, the stroke limit check can be carried out during the program check performed in the machine lock state and also the time required for the program check can be shortened.

BRIEF DESCRIPTION OF THE DRAWINGS

FIG. 7 is a flowchart exemplifying a machining simulation check performed by a controller of a numerical controller; and FIG. 8 is a diagram showing an exemplary configuration of a numerical controller with a drawing function whereby a tool path is drawn at display means to permit program check.

DETAILED DESCRIPTION

Figure 1:
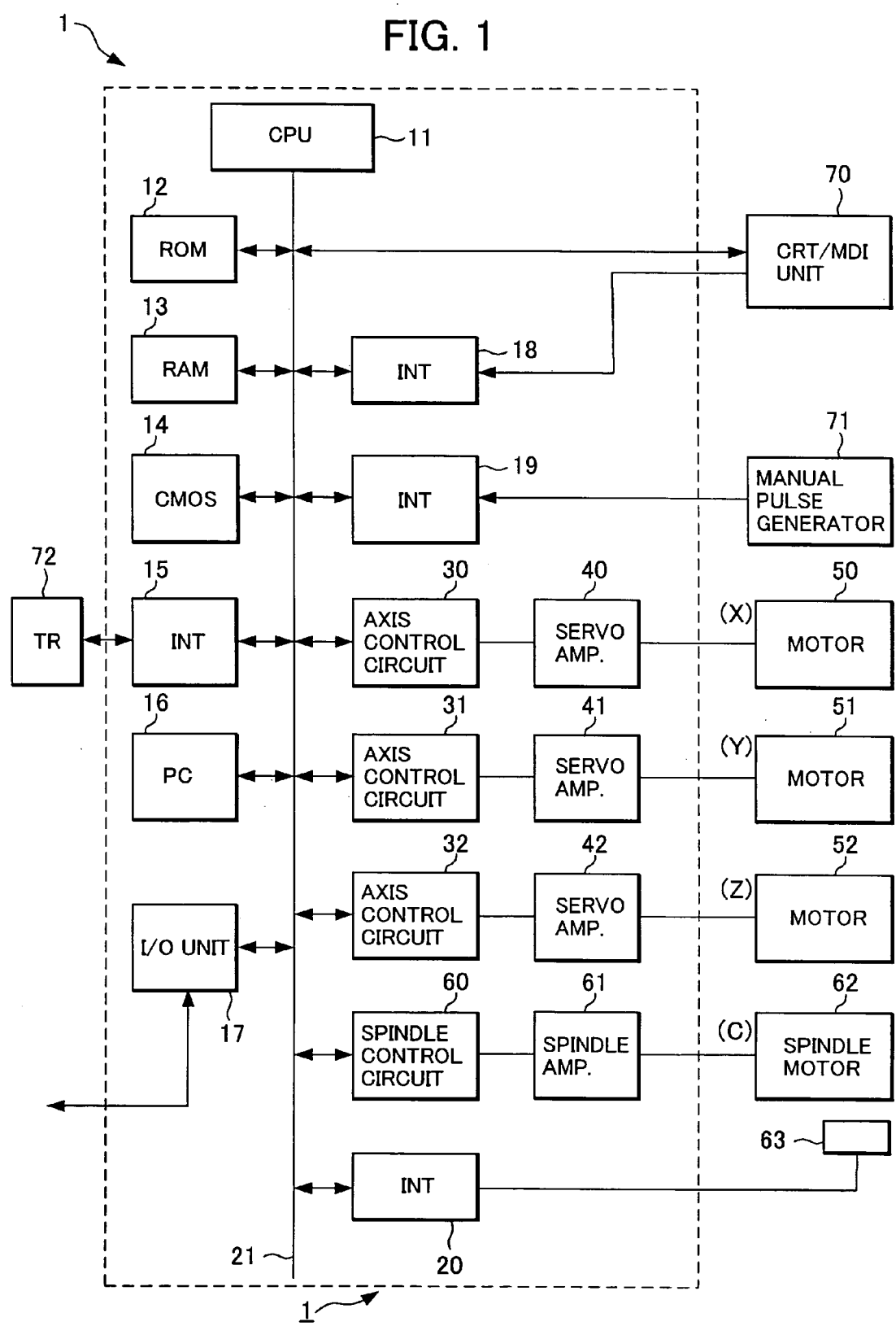
FIG. 1 is a block diagram exemplifying the hardware configuration of a numerical controller according to the present invention.

FIG. 1 is a block diagram showing the hardware configuration of a numerical controller (hereinafter referred to as NC device) 1 according to one embodiment of the invention. A processor (hereinafter referred to as CPU) 11, which is a processor for globally controlling the NC device 1, reads out via a bus 21 system programs stored in a ROM 12, and globally controls the NC device 1 in accordance with the system programs. A RAM 13 temporarily stores calculation data and display data, as well as various data etc. input by the operator through a CRT/MDI unit 70.

A CMOS memory 14 is a nonvolatile memory which is backed up by a battery, not shown, and thus is capable of retaining the stored data even if the power supply to the NC device 1 is cut off. The CMOS memory stores an NC machining program read in via an interface 15 and an NC machining program etc. input through the CRT/MDI unit 70. In the ROM 12 are written in advance various system programs for performing an edit mode process necessary for the creation and editing of NC machining programs, a playback mode process for automatic operation, and a process necessary for program check, stroke limit check, tool moving path check, etc.

The interface 15 is provided for external equipment connectable to the NC device 1 and is connected, for example, with an external device 72 such as a paper tape reader, a paper tape puncher or an external storage device. An NC machining program and the like are read in from the paper tape reader or the external storage device, and the NC machining program edited in the NC device 1 can be output to the paper tape puncher or the external storage device.

A PC (programmable controller) 16 controls auxiliary equipment of an NC machine tool, for example, actuators such as a tool changing robot hand, in accordance with sequence programs built into the NC device 1. Specifically, according to M function, S function and T function specified by the NC machining program, the PC converts commands into signals necessary for actuating the auxiliary equipment by the sequence programs and outputs the resultant signals to the auxiliary equipment through an input/output unit 17. The auxiliary equipment such as various actuators operates in accordance with the output signals. Also, the PC is supplied with signals from limit switches arranged in the body of the NC machine tool and in the auxiliary equipment, as well as signals from various switches of the operator's panel associated with the body of the NC machine tool, performs necessary processing on the received signals, and transfers the processed signals to the CPU 11.

Image signals indicative of current positions of individual axes of the NC machine tool, alarms, parameters, image data, etc. are sent to the CRT/MDI unit 70 and displayed on a graphic display thereof. The CRT/MDI unit 70 is a manual data input device equipped with a graphic display, a keyboard, various soft keys, etc., and an interface 18 transfers data received from the keyboard of the CRT/MDI unit 70 to the CPU 11. Also, where a system program for automatic programming stored in the ROM 12 is started, an interactive screen is displayed on the graphic display of the CRT/MDI unit 70, so that an NC machining program can be created in an interactive manner by inputting simple data relating to a product shape etc., that is, so-called automatic programming can be performed. An interface 19 is connected to a manual pulse generator 71 and supplied with pulses therefrom. The manual pulse generator 71 is incorporated in the operator's panel of the NC machine tool and is used to precisely position the movable parts of the NC machine tool through control of the individual axes by means of distribution pulses generated by manual operation.

Axis control circuits 30 to 32 are supplied with motion commands for the respective axes from the CPU 11 and output the commands to respective servo amplifiers 40 to 42. On receiving the commands, the servo amplifiers 40 to 42 drive respective servomotors 50 to 52 associated with the respective axes of the NC machine tool. The servomotors 50 to 52 associated with the respective axes each have a pulse coder built therein for position detection, and a position signal is fed back from each pulse coder as a pulse train. When necessary, linear scales are used as the position detectors. By subjecting each pulse train to F/V (frequency/velocity) conversion, it is possible to generate a velocity signal. The feedback of the position signals and velocity feedback are not illustrated in FIG. 1.

A spindle control circuit 60 is supplied with a spindle rotation command for the NC machine tool and outputs a spindle velocity signal to a spindle amplifier 61. On receiving the spindle velocity signal, the spindle amplifier 61 rotates a spindle motor 62 of the NC machine tool at the rotational velocity as instructed. A position coder 63 is coupled to the spindle motor 62 through gears, a belt or the like and outputs a feedback pulse in synchronism with rotation of the spindle, the feedback pulse being read by the CPU 11 via an interface 20. In the case of positioning the spindle at a predetermined rotational position specified by the NC machining program etc. to carry out C axis control, a one-rotation signal from the position coder 63 is detected and the spindle position is controlled by the processing of the CPU 11.

Figure 2:
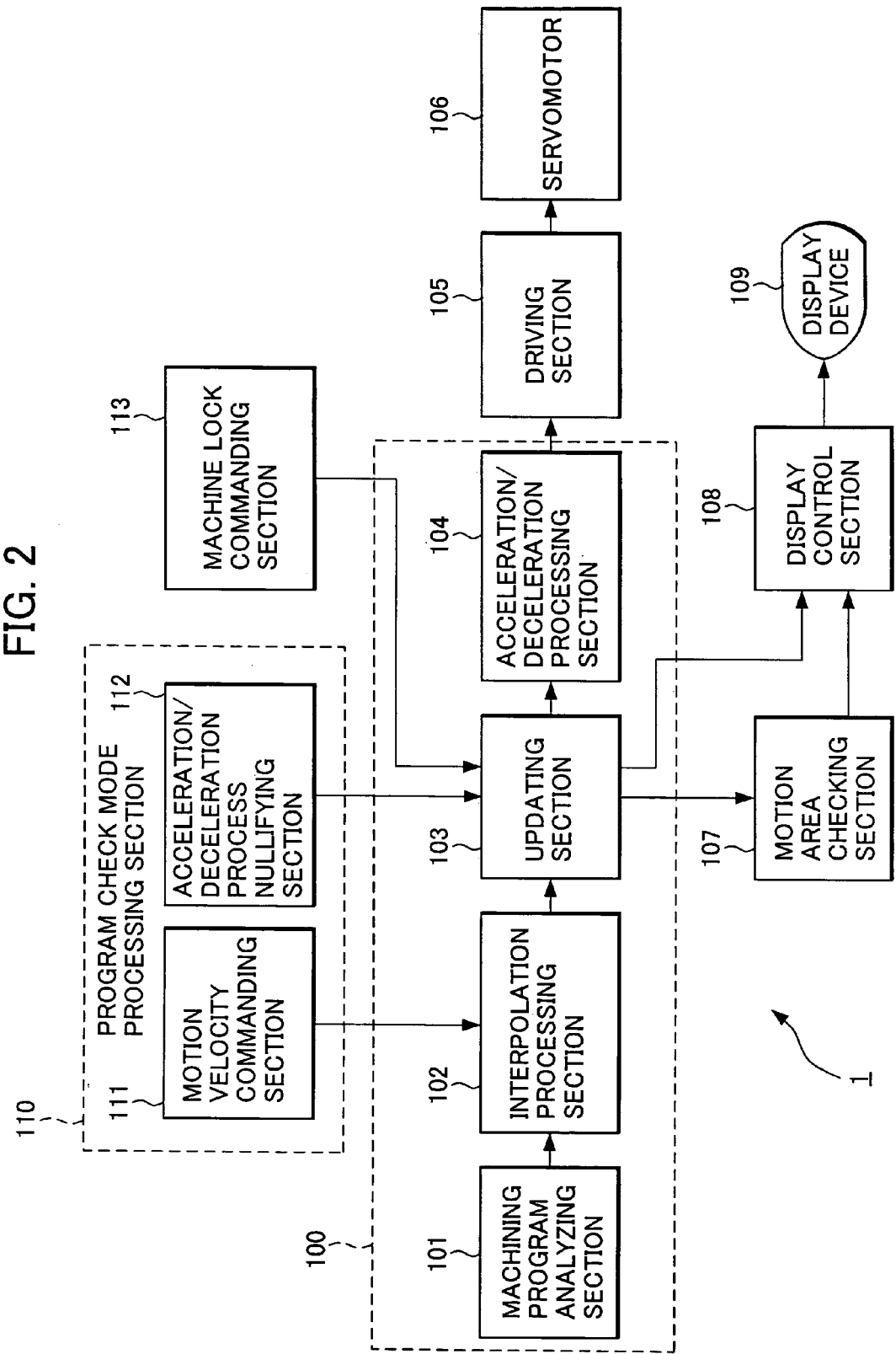
FIG. 2 is a functional block diagram illustrating processing of a machining program by the NC device and machining program check function.

Processing of a machining program by the NC device 1 and machining program check function will be now described with reference to the functional block diagram of FIG. 2. As shown in FIG. 2, the NC device 1 includes, in addition to elements usually provided to drive a machine motion axis, that is, a controller 100, a driving section (servo amplifier) 105 and a motor (servomotor) 106, a program check mode processing section 110 and a motion area checking section 107 for performing program check, a machine lock commanding section 113 for causing a machine lock state, and a display control section 108 and a display device 109 for displaying program check results etc.

The controller 100 includes a machining program analyzing section 101, an interpolation processing section 102, an updating section 103, and an acceleration/deceleration processing section 104. The machining program analyzing section 101 analyzes a machining program. The machining program may be input to the analyzer via communication means or may be read from a buffer or a memory.

The machining program analyzing section 101 outputs a command based on the description in each block of the analyzed machining program. For example, if a motion command is included in the block, the analyzer sends motion command data to the interpolation processing section 102. If, on the other hand, M code, S code, T code or the like is included, the analyzer sends command data to the programmable controller etc. In accordance with the motion command, the interpolation processing section 102 performs interpolation, and in accordance with the result of interpolation, the updating section 103 updates machine coordinates. Based on the machine coordinates updated by the updating section 103, the acceleration/deceleration processing section 104 performs an acceleration/deceleration process and controls the operation of the motor 106 through the driving section 105. During normal driving control, the motor is controlled in this manner in accordance with the machining program, so that the machine motion axis is moved to carry out machining.

The program check mode processing section 110 and the motion area checking section 107, on the other hand, constitute a mechanism for performing the function of carrying out the format check of a machining program as well as the stroke limit check, prior to actual machining, to ensure that the program works properly.

The program check mode processing section 110 includes a motion velocity commanding section 111 and an acceleration/deceleration process nullifying section 112. The program check mode processing section 110 is set in program check mode by an input signal, not shown, whereupon the processor 110 instructs the controller 100 to perform process in the program check mode. During the program check mode, the motion velocity commanding section 111 sends a motion velocity command to, for example, the interpolation processing section 102 in the controller 100, so that the interpolation processing section performs interpolation based on the instructed motion velocity and generates interpolated motion amount data. The motion velocity to be instructed can be set to a maximum velocity of the system, whereby the program can be checked at an increased processing velocity.

Also, during the program check mode, the acceleration/deceleration process nullifying section 112 nullifies an axis motion command supplied from the interpolation processing section 102 to the acceleration/deceleration processing section 104 of the controller 100. Accordingly, a state equivalent to the machine lock state is created, whereby the processing time for the acceleration/deceleration control is saved and thus the time required for the program check is shortened.

In FIG. 2, the updating section 103 is arranged between the interpolation processing section 102 and the acceleration/deceleration processing section 104, and because of this configuration, the acceleration/deceleration process nullifying section 112 is adapted to input a command to the updating section 103 to nullify the axis motion command supplied from the interpolation processing section 102 to the acceleration/deceleration processing section 104.

In the machine lock state, the programmed operation is continued while the axis movement resulting from the interpolation is nullified, and the machine lock is often carried out also in operation modes other than the program check mode. The machine lock commanding section 113 causes the machine lock to take place in the other operation modes than the program check mode.

The motion area checking section 107 acquires the machine coordinates updated by the updating section 103, then determines whether the position of the machine motion axis is within a motion area or an entry forbidden area, and displays the determination result on the display device 109 via the display control section 108.

Figure 3:
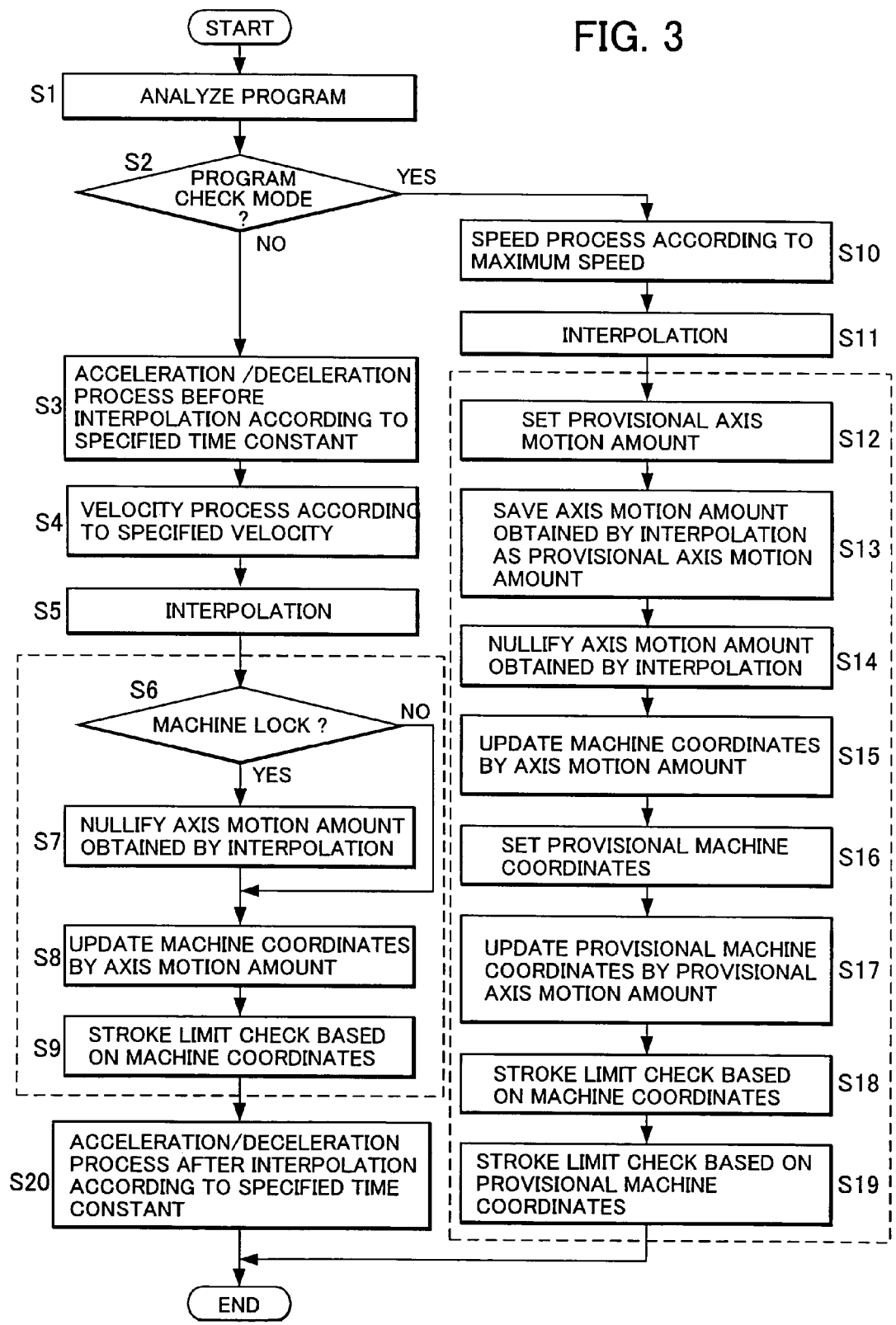
FIG. 3 is a flowchart illustrating the operation of a controller according to the present invention.

Operation of the controller 100 will be now described with reference to the flowchart of FIG. 3.

The machining program analyzing section 101 analyzes a machining program input thereto via communication means, not shown, or read from memory (Step S1), and determines whether or not the program check mode is set in the machining program (Step S2).

If the program check mode is not set (Step S2), an acceleration/deceleration process before interpolation is performed using the specified time constant (Step S3), a velocity process is performed using the specified velocity (Step S4), and then interpolation is performed in the interpolation processing section 102 to calculate an amount of movement of the machine motion axis (Step S5).

Subsequently, if the machine lock is not specified (Step S6), normal machining operation is carried out in the following manner: The updating section 103 acquires the amount of movement of the machine motion axis calculated by the interpolation processing section 102, to update the machine coordinates (Step S8). Then, the stroke limit check is performed based on the updated machine coordinates, and if it is ascertained that the machine coordinates do not fall within a forbidden area (Step S9), an acceleration/deceleration process after interpolation is performed using the specified time constant (Step S20), to drive the motor 106 through the driving section 105. If, in Step S9, the machine coordinates are found to fall within a forbidden area, the machine motion axis is decelerated and stopped and an alarm or the like is displayed, for example.

If, after the interpolation in Step S5, the machine lock is specified by a command from the machine lock commanding section 113 (Step S6), the axis motion amount obtained by the interpolation is nullified (Step S7) since the axis should not be moved in the machine lock state. Also, in the machine lock state, since the machine coordinates do not change while the program is run, the stroke limit check is not effective but it is still useful to perform the stroke limit check in an initial state of machine lock. Accordingly, the machine coordinates are changed using the axis motion amount (Step S8) and the stroke limit check is performed based on the machine coordinates (Step S9), whereby the initial state of machine lock can be confirmed.

On the other hand, if the program check mode is set (Step S2), the acceleration/deceleration before interpolation is not carried out, and after the velocity process is performed based on a maximum velocity command from the motion velocity commanding section 111 (Step S10), interpolation is performed in the interpolation processing section 102 to calculate an amount of movement of the machine motion axis (Step S11).

Subsequently, the machine coordinates and provisional machine coordinates are updated in the updating section (Steps S12 to S17) and the stroke limit check is performed (Steps S18 and S19).

Specifically, first, a provisional axis motion amount is set (Step S12), and after the axis motion amount obtained by the interpolation in Step S11 is saved as the provisional axis motion amount (Step S13), the axis motion amount is nullified. Thus, the acceleration/deceleration processing is not performed (Step S14) in accordance with a nullifying command from the acceleration/deceleration process nullifying section 112.

Ordinary machine coordinates are updated using the axis motion amount sent to the acceleration/deceleration processing section 104, and since the axis motion amount is nullified in Step S14, the machine coordinates fail to be updated. Accordingly, to permit the stroke limit check to be performed based on the machine coordinates, the machine coordinates are updated using the axis motion amount (Step S15).

Then, provisional machine coordinates are set (Step S16) and are updated by accumulating the provisional axis motion amount saved in Step S13. It is therefore possible to derive provisional machine coordinates based on the program (Step S17) though, in the program check mode, the machine coordinates based on an actual movement of the machine motion axis cannot be obtained.

The motion area checking section 107 performs the stroke limit check based on the machine coordinates updated using the provisional machine coordinates in the updating section 103, and displays the check result. In this case, the acceleration/deceleration after interpolation is not carried out (Step S19).

Since the ordinary machine coordinates are not updated, it is not useful to perform the stroke limit check based on the machine coordinates; however, safety can be ensured by performing the stroke limit check based on the machine coordinates updated in Step S15 (Step S18).

Figure 4:
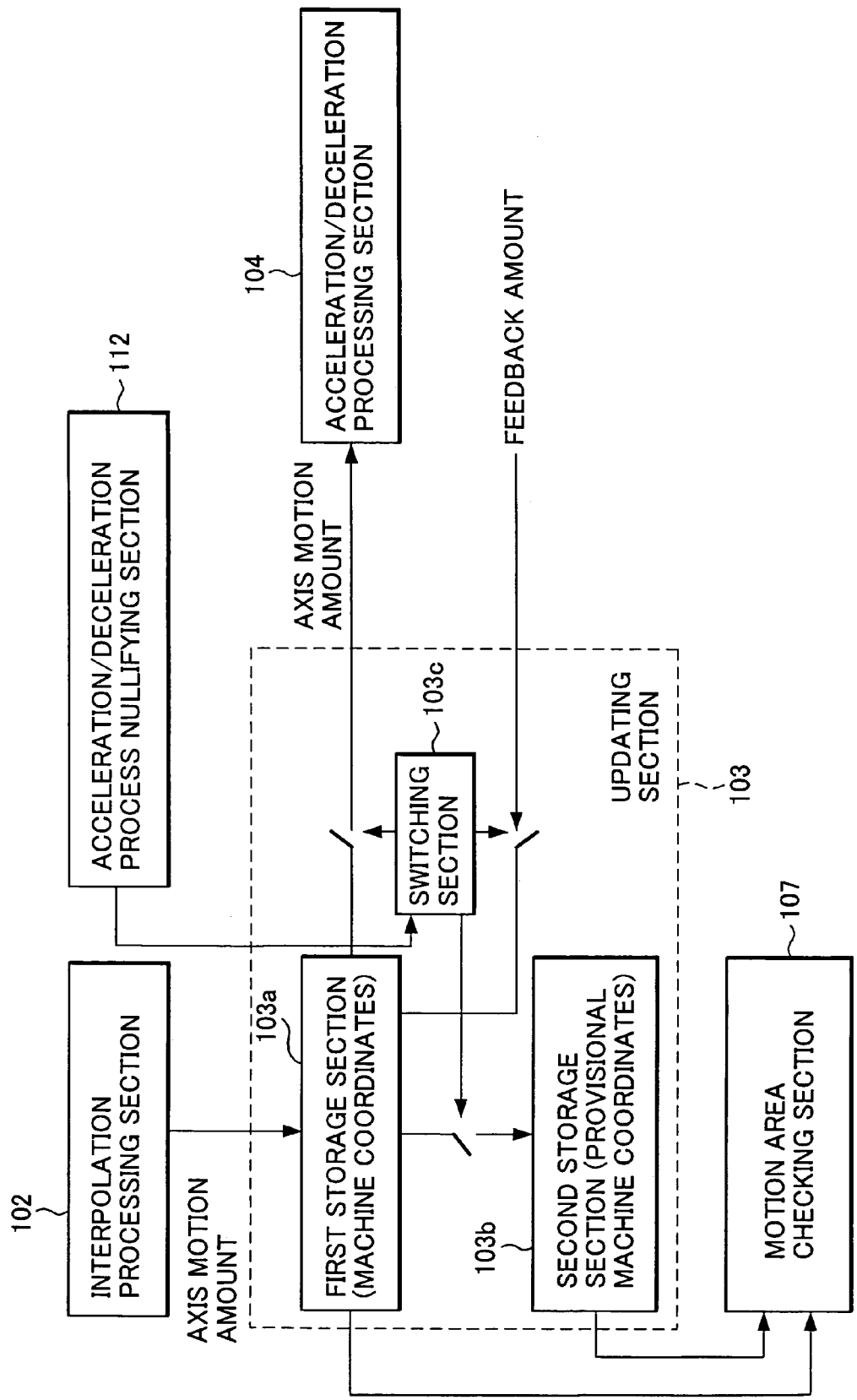
FIG. 4 is a diagram exemplifying the configuration of an updating section according to the present invention.
Figure 5:
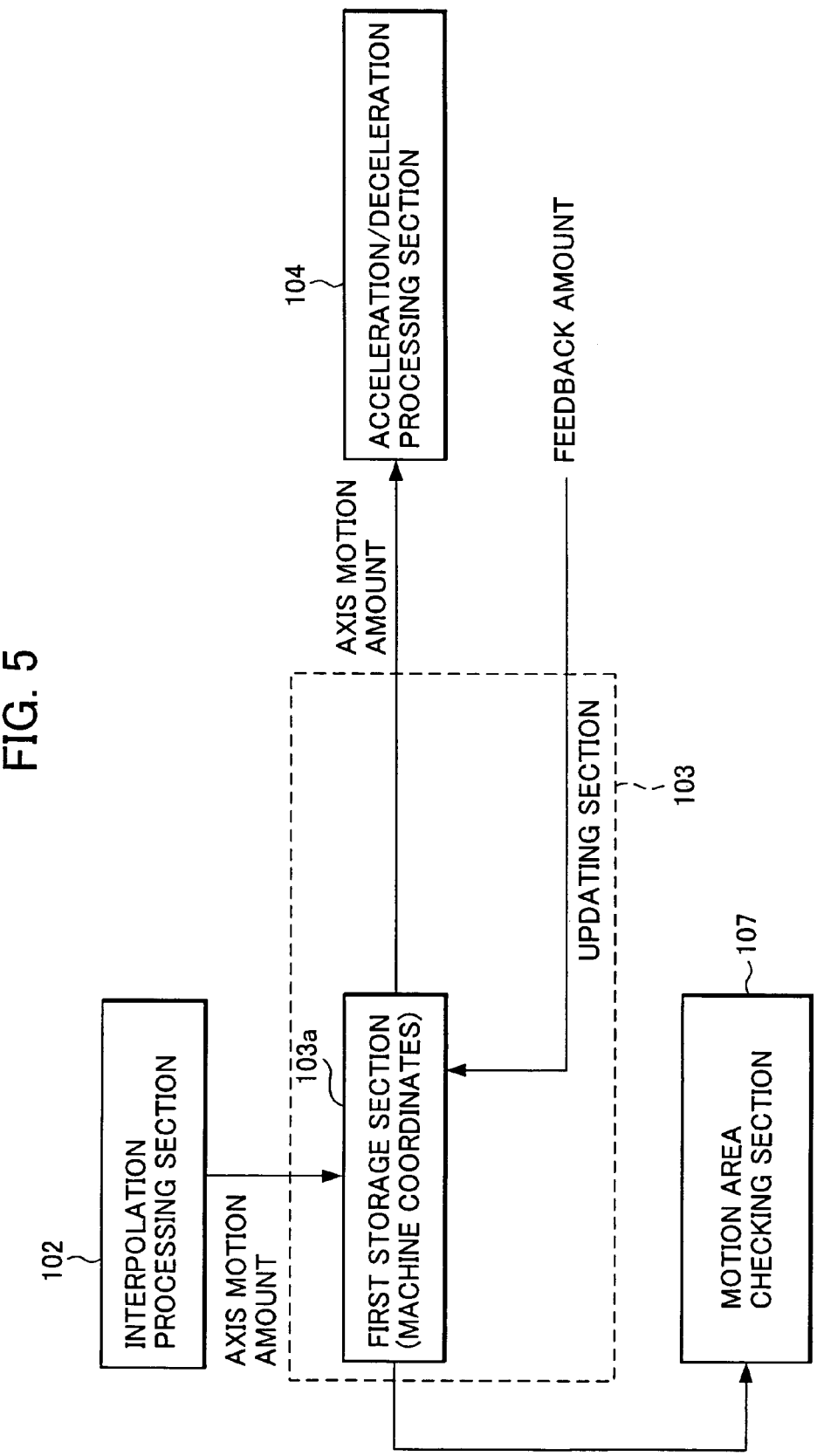
FIG. 5 is a diagram illustrating an operating state of the updating section during normal machining.
Figure 6:
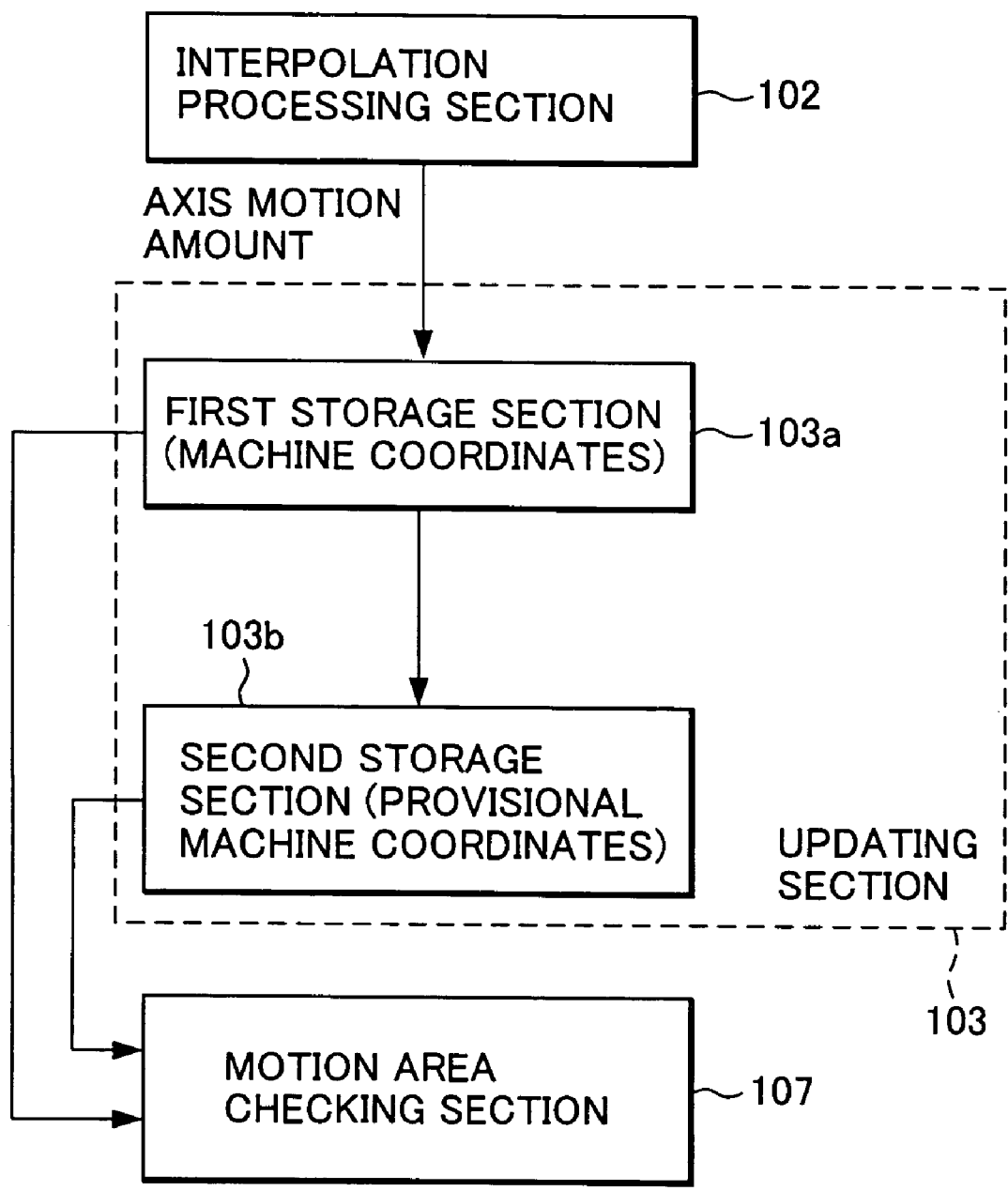
FIG. 6 is a diagram illustrating an operating state of the updating section in program check mode.

Referring now to FIGS. 4 to 6, exemplary configuration and operation of the updating section will be described.

FIG. 4 shows the configuration of the updating section by way of example. As shown in FIG. 4, the updating section 103 comprises a first storage section 103a for storing the ordinary machine coordinates, a second storage section 103b for storing the provisional machine coordinates, and a switching section 103c.

The first storage section 103a is supplied from the interpolation processing section 102 with the axis motion amount calculated thereby, holds the axis motion amount, and sends same to the acceleration/deceleration processing section 104. Also, the first storage section 103a is fed with the position feedback amount back from the machine motion axis side, and the axis motion amount as well as the position of the machine motion axis are updated.

During the program check mode, a command is applied from the acceleration/deceleration process nullifying section 112 to the switching section 103c to cut off the connection between the first storage section 103a and the acceleration/deceleration processing section 104 and between the machine motion axis side and the first storage section 103a. When the connection between the first storage section 103a and the acceleration/deceleration processing section 104 is cut off by the switching section 103c, the first and second memories 103a and 103b are connected to each other and the axis motion amount held by the first storage section 103a is stored in the second storage section 103b. Accordingly, the axis motion amount calculated by the interpolation processing section 102 is thereafter also saved in the second storage section 103b and updated. The feedback amount is not fed back to the second storage section 103b, and therefore, the coordinates stored in the second storage section represent the provisional machine coordinates derived based on the program.

The motion area checking section 107 performs the stroke limit check based on the coordinates stored in the first and second memories 103a and 103b of the updating section 103.

FIG. 5 illustrates an operating state during normal machining. In this operating state, the first storage section 103a updates the machine coordinates, which are the ordinary machine coordinates, based on the axis motion amount calculated by the interpolation processing section 102 and the feedback amount, and sends the updated machine coordinates, or the axis motion amount, to the acceleration/deceleration processing section 104.

FIG. 6 illustrates an operating state in the program check mode. In this operation mode, the first storage section 103a does not update the machine coordinates stored therein. Instead, the first storage section sends the axis motion amount calculated by the interpolation processing section 102 to the second storage section 103b, which then updates the machine coordinates stored therein.

What is claimed is:

1. A numerical controller having a function of checking a machining program while retaining motion axes of a machine as controlled objects in immovable state, said controller comprising:
    motion velocity commanding means for outputting a command to set maximum velocities of the motion axes;
    motion amount calculating means for analyzing the machining program to calculate motion amounts of the motion axes in accordance with the command outputted from said motion velocity commanding means;
    updating means for updating machine coordinates by the motion amounts of the motion axes calculated by said motion amount calculating means, and storing the updated machine coordinates; and
    checking means for checking a motion area of the machine based on the stored machine coordinates.

2. A numerical controller according to claim 1, wherein said motion amount calculating means comprising a machining program analyzing section for analyzing the machining program, a block processing section for executing individual blocks of the analyzed machining program, and an interpolation processing section for performing interpolation on motion commands in the machining program to obtain the motion amounts,
    wherein said interpolation processing section calculates the motion amounts in accordance with the maximum velocities commanded by said motion velocity commanding means.

3. A numerical controller according to claim 1, wherein said updating means including a first storage section for storing machine coordinates updated with actual motions of the motion axes by feedback amounts of the motion axes and the motion amounts calculated by said interpolation processing section, and a second storage section for storing provisional machine coordinates updated without actual motions of the motion axes by the motion amounts calculated by said interpolation processing section,
    wherein said checking means checks the motion area based on at least the provisional machine coordinates stored in said second storage section.

4. A numerical controller having a function of checking a machining program while retaining motion axes of a machine as controlled objects in immovable state, said controller comprising:
    motion amount calculating means for analyzing the program to calculate motion amounts of the motion axes;
    acceleration/deceleration processing means for performing acceleration/deceleration process on the motion amounts calculated by said motion amount calculating means;
    acceleration/deceleration process nullifying means for nullifying said acceleration/deceleration processing means;
    updating means for updating machine coordinates by the motion amounts of the motion axes calculated by said motion amount calculating means, and storing the updated machine coordinates; and
    checking means for checking a motion area of the machine based on the stored machine coordinates.

5. A numerical controller according to claim 4, wherein said updating means including a first storage section for storing machine coordinates updated with actual motions of the motion axes by feedback amounts of the motion axes and the motion amounts calculated by said interpolation processing section, and a second storage section for storing provisional machine coordinates updated without actual motions of the motion axes by the motion amounts calculated by said interpolation processing section,
    wherein said checking means checks the motion area based on at least the provisional machine coordinates stored in said second storage section.

6. A numerical controller according to claim 5, wherein said updating means stops the updating of the machine coordinates by said first storage section and starts the updating of the provisional machine coordinates by said second storage section in response to a command from said acceleration/deceleration process nullifying means.

7. A numerical controller having a function of checking a machining program while retaining motion axes of a machine as controlled objects in immovable state, said controller comprising:
    motion velocity commanding means for outputting a command to set maximum velocities of the motion axes;
    motion amount calculating means for analyzing the machining program to calculate motion amounts of the motion axes in accordance with the command outputted from the motion velocity commanding means;
    acceleration/deceleration processing means for performing acceleration/deceleration process according to a set time constant on the motion amounts calculated by said motion amount calculating means;
    acceleration/deceleration process nullifying means for nullifying said acceleration/deceleration processing means;
    updating means for updating machine coordinates by the motion amounts of the motion axes calculated by said motion amount calculating means, and storing the updated machine coordinates; and checking means for checking a motion area of the machine based on the stored machine coordinates.

8. A numerical controller according to claim 7, wherein said motion amount calculating means comprising a machining program analyzing section for analyzing the machining program, a block processing section for executing individual blocks of the analyzed machining program, and an interpolation processing section for performing interpolation on motion commands in the machining program to obtain the motion amounts, wherein said interpolation processing section calculates the motion amounts in accordance with the maximum velocities commanded by said motion velocity commanding means.

9. A numerical controller according to claim 7, wherein said updating means including a first storage section for storing machine coordinates updated with actual motions of the motion axes by feedback amounts of the motion axes and the motion amounts calculated by said interpolation processing section, and a second storage section for storing provisional machine coordinates updated without actual motions of the motion axes by the motion amounts calculated by said interpolation processing section, wherein said checking means checks the motion area based on at least the provisional machine coordinates stored in said second storage section.

10. A numerical controller according to claim 9, wherein said updating means stops the updating of the machine coordinates by said first storage section and starts the updating of the provisional machine coordinates by said second storage section in response to a command from said acceleration/deceleration process nullifying means.

* * * * *

UNITED STATES PATENT AND TRADEMARK OFFICE
CERTIFICATE OF CORRECTION

PATENT NO. : 7,203,568 B2 Page 1 of 1
APPLICATION NO. : 11/154593
DATED : April 10, 2007
INVENTOR(S) : Eiji Genma et al.

It is certified that error appears in the above-identified patent and that said Letters Patent is hereby corrected as shown below:

In the drawings:

FIG. 7, Line 1, above "FIG. 7" insert --PRIOR ART--.

Signed and Sealed this

Third Day of July, 2007

JON W. DUDAS
*Director of the United States Patent and Trademark Office*